Nov. 4, 1969  E. HITZELBERGER  3,476,435

MOTOR VEHICLE SEAT

Filed May 18, 1967

INVENTOR
ERWIN HITZELBERGER

BY *Dicke & Craig*

ATTORNEYS

United States Patent Office 3,476,435
Patented Nov. 4, 1969

3,476,435
MOTOR VEHICLE SEAT
Erwin Hitzelberger, Stuttgart-Rohr, Germany, assignor to Daimler-Benz Aktiengesellschaft, Stuttgart-Untertürkheim, Germany
Filed May 18, 1967, Ser. No. 639,537
Claims priority, application Germany, May 20, 1966, D 50,158
Int. Cl. B60n 1/02
U.S. Cl. 296—65                                    17 Claims

ABSTRACT OF THE DISCLOSURE

A motor vehicle seat in which generally upright guide rails are secured at the generally upright web portions of the center tunnel and/or longitudinal bearers of the frame; generally upright slide rails connected with the seat frame are slidingly received within the guide rails, the slide rails may be secured with the seat frame by intermediate pieces extending through gaps left between bent-back leg portions of the guide rails. A locking mechanism is provided for holding the seat in any desired position which includes a pivotal lever and linkages connected to the lever on both sides of the pivot point; the linkages, in turn, are provided with engaging bolts adapted to be engaged in or retracted out of apertures provided in the guide rails or appropriate flat-iron bars mounted in the guide rails.

BACKGROUND OF THE INVENTION

The present invention relates to a motor vehicle seat with guide rails secured at the vehicle frame and supports for the seat which are adjustable and adapted to be locked within the guide rails.

The prior art motor vehicle seats of this type entail the disadvantage that the guide rails for the seat are secured either directly or indirectly by way of intermediate parts on the seat bearer or on the vehicle floor. It is not possible with this type of construction to make the guide rails considerably longer than the seat because otherwise the ends of the guide rails would project in front of the seat or to the rear of the seat. As a result thereof, obstacles occur at the floor which under certain circumstances, apart from the unattractive appearance thereof, may lead, for example, to damages at the footwear of the passengers seated in the rear seat. The prior art motor vehicle seats therefore can be adjusted rearwardly or forwardly only within certain limits by reason of the short guide rails or the rails of the seat sliding within the guide rails project partly out of the guide rails during the forward or rearward adjustment of the seat to the end position thereof. Additionally, the stability of the seat support may be considerably impaired thereby.

A further disadvantage of the known seat construction resides in the fact that the part of the floor cover extending underneath the seat has to be cut specially. Moreover, the part of the floor disposed below the seat can be cleaned only with difficulties.

SUMMARY OF THE INVENTION

The present invention aims at avoiding the aforementioned disadvantages. The present invention essentially consists in that the guide rails for the seat are arranged upright or on-edge and are secured at the vertically disposed web surfaces of the center tunnel of the vehicle and/or the vertical parts of the lateral bearers of the motor vehicle frame. By such an arrangement, the floor underneath the seat can be kept completely free of guide rails so that the aforementioned disadvantages do not occur. Simultaneously therewith, the guide rail track is increased so that also the stability of the seat in the transverse direction can be increased. Additionally, the possibility of a non-uniformly or unequally rigid support for the seat can be achieved by the present invention with slight structural expenditures.

Advantageously, the guide rails are secured directly at the vertical sheet-metal web parts of the center tunnel and/or of the lateral longitudinal bearers. However, they may also be arranged by way of intermediate parts. A particularly advantageous construction is made possible by the present invention insofar as the guide rails can have a length which corresponds to the length of the slide rails secured at the seat plus the length of the entire adjusting range. Simultaneously therewith, the guide rails may also be so arranged with this construction that the slide rails of the seat are surrounded completely by the guide rails in every position of the seat. The aforementioned disadvantages of short guide rails can therefore be avoided by the present invention.

Finally, a detent or locking mechanism for fixing the seat can also be provided in a particularly simple manner by the present invention which consists of a pivotal lever that is connected on both sides of its pivot point of rotation with a linkage which guides a bolt or the like into or out of corresponding locking places provided at the guide rails.

Accordingly, it is an object of the present invention to provide a motor vehicle seat of the type described above which eliminates by extremely simple means all of the aforementioned shortcomings and drawbacks encountered with the prior art constructions.

Another object of the present invention resides in an adjustable motor vehicle seat in which no guide rails are used within the area underneath the seat, thereby facilitating cleaning of that floor area.

A further object of the present invention resides in an adjustable vehicle seat which minimizes danger to footwear of the passengers, particularly of the rear passengers by the presence of protruding parts of the adjusting mechanism.

Still a further object of the present invention resides in an adjustable motor vehicle seat which permits an increased adjusting range of the seat without the use of objectionable and unattractive guide rails.

Another object of the present invention resides in an adjustable motor vehicle seat obviating the need for special cutting of the vehicle floor cover which extends underneath the seats.

Still another object of the present invention resides in an adjustable motor vehicle seat which results in greater stability of the seat in the transverse direction of the vehicle.

These and further objects, features, and advantages of the present invention will become more obvious from the following description when taken in connection with the accompanying drawing which shows, for purposes of illustration only, one embodiment in accordance with the present invention, and wherein.

Figure 1:
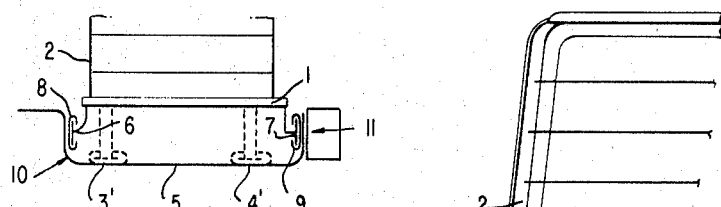
FIGURE 1 is a schematic cross-sectional view, transversely to the driving direction of the vehicle, through a vehicle seat in accordance with the present invention.

Referring now to the drawing, wherein like reference numerals are used throughout the various views to designate like parts, and more particularly to FIGURE 1, reference numeral 1 designates therein the schematically illustrated seat frame together with the frame 2 for the backrest of the seat. The hitherto customary support of the seat in guide rails 3' and 4' is indicated in this figure in dash lines which are arranged and secured horizontally on the vehicle floor 5. The aforementioned disadvantages of the known seat arrangements occur with this prior art construction.

According to the present invention, the seat frame 1 is now supported with the aid of the slide rails 6 and 7 in the upright, one-edge guide rails 8 and 9 which are secured at the vertical or upright web surfaces 10 of the center tunnel or in another construction at the vertically extending parts 11 of the lateral longitudinal bearer of the motor vehicle.

Figure 2:
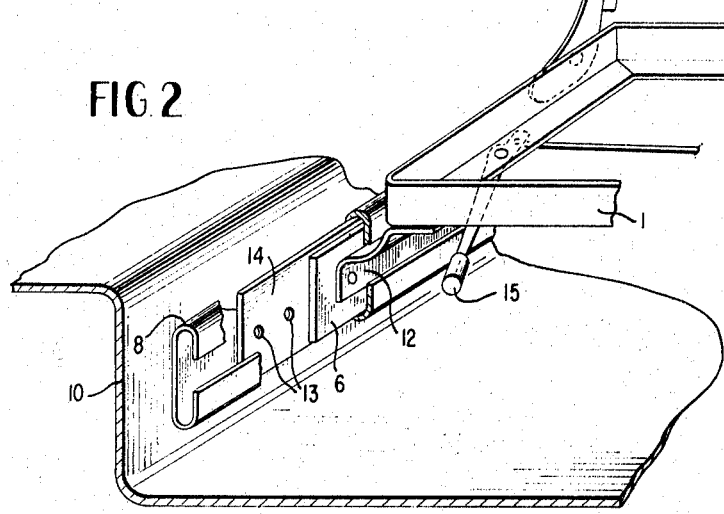
FIGURE 2 is a partial perspective view, on an enlarged scale, of a guide rail together with the frame of the seat arranged in the motor vehicle in accordance with the present invention.

As can be readily seen from FIGURE 2, the slide rail 6 is connected with the seat frame 1 by way of the connecting piece 12 which is so constructed and arranged that it can project between the bent-back leg portions of the guide rail 8 leaving therebetween a gap. A flat steel bar 14 provided with several apertures 13 is additionally arranged within the guide rail 8 on which the guide rail 6 can slide to and fro during an adjustment of the seat. The flat steel bar 14 may be secured in the guide rail 8 in any conventional manner. Furthermore, a pivotal lever 15 (FIGS. 2 and 3) is arranged at the seat frame 1 which serves to disengage the locking engagement of the mechanism for the purpose of adjusting the seat.

Figure 3:
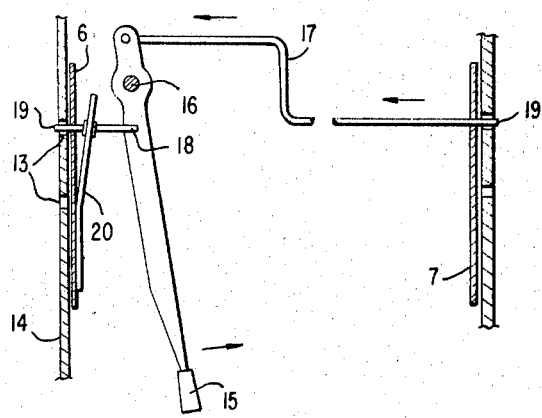
FIGURE 3 is a schematic cross-sectional view through an embodiment of the detent locking mechanism for the adjustable seat in accordance with the present invention.

The detent locking mechanism arranged at the adjustable seat frame 1 is illustrated in detail in FIGURE 3. As can be readily seen from this figure, the pivotal lever 15 is connected at approximately the same distance from its pivot point of rotation 16 on both sides thereof with one linkage 17 and 18 each, which during a movement of the lever 15 in the direction of the arrow carry out movements also in the respective direction of the arrows as indicated in the drawing. Bolts 19 or the like are mounted or secured at the outer ends of the linkage 17 and 18 which are adapted to engage in the aforementioned apertures 13 of the flat steel bars 14 and are normally held in these apertures 13 by the force of a leaf spring 20 connected with the slide rail 6. In this manner, the seat frame 1 is stopped in a certain position.

If a seat adjustment is desired, then the lever 15 is displaced in the direction of the arrow, whereby the bolts are pulled out of or retracted from the apertures 13 against the effect of the spring 20 so that a relative movement between the slide rails 6 and 7 and the guide rails 8 and 9 (not shown in FIGURE 3) or the corresponding flat iron bars 14 provided with the apertures 13 can take place. Once the seat is adjusted sufficiently, then it suffices to release the lever 15 which thereupon is automatically pressed back by the effect of the spring 20 until the bolts 19 snap into the next corresponding engaging aperture 13 with slight displacement of the seat.

In normal installations, the guide rails are fastened along the upright lateral walls 10 of the center tunnel and the inwardly disposed lateral walls of the longitudinal bearers 11, as shown in FIGURE 1. Such an arrangement is particularly suitable for bucket-type front seats but can also be used for bench-type front seats.

While I have shown and described one embodiment in accordance with the present invention, it is understood that the same is not limited thereto but is susceptible of numerous changes and modifications as known to a person skilled in the art, and I therefore do not wish to be limited to the details shown and described herein, but intend to cover all such changes and modifications as would be obvious to a normally-skilled craftsman in the subject art.

I claim:

1. In a motor vehicle body having relatively fixed parts, including side walls with access openings therein, and a floor with a longitudinally-extending center tunnel, a seat arrangement comprising seat frame means, channel-shaped guide rail means and adjustable support means operatively connected with the vehicle seat and supporting same within said guide rail means in an adjustable and selectively lockable manner, said guide rail means being secured, at substantially vertically-extending portions of a relatively fixed part of the vehicle body below said access openings and of the center tunnel, with the base portion of said channel-shaped guide rail means being thus oriented in a substantially vertical plane.

2. A combination according to claim 1, wherein said relatively fixed part is a lateral longitudinally-extending bearer means.

3. A motor vehicle seat according to claim 1, further comprising locking means for fixing the seat including pivotal lever means having a pivot point, linkage means connected with said lever means on both sides of the pivot point thereof, and bolt means on said linkage means adapted to be extended into or retracted from detent apertures provided in the guide rail means.

4. A motor vehicle seat according to claim 3, further comprising flat-iron bar means having several apertures serving as locking places, said flat-iron bar means being arranged within the guide rail means.

5. A motor vehicle seat according to claim 4, further comprising spring means for retaining the bolt means in the engaging positions, said bolt means being adapted to be retracted from the engaging positions by actuating of the lever means.

6. A motor vehicle seat according to claim 3, further comprising spring means for retaining the bolt means in the engaging positions, said bolt means being adapted to be retracted from the engaging positions by actuating of the lever means.

7. In a motor vehicle body having relatively fixed parts, including side walls with access openings therein, and a floor with a longitudinally-extending center tunnel, a seat arrangement comprising seat frame means, channel-shaped guide rail means and adjustable support means operatively connected with the vehicle seat and supporting same within said guide rail means in an adjustable and selectively lockable manner, said guide rail means being secured, at substantially vertically-extending portions of a relatively fixed part of the vehicle body below said access openings, with the base portion of said channel-shaped guide rail means being thus oriented in a substantially vertical plane, wherein said guide rail means include bent-over leg portions defining a gap therebetween, said adjustable support means including slide rail means slidable within said guide rail means and intermediate members extending through said gap and connecting said slide rail means and said seat frame means.

8. A combination according to claim 7, wherein said guide rail means are secured at the center tunnel.

9. A motor vehicle seat according to claim 7, wherein said guide rail means have a length which corresponds to the length of the slide rail means secured at the seat plus the length of the entire adjusting range.

10. A motor vehicle seat according to claim 7, wherein said guide rail means have a length which corresponds to the length of the slide rail means secured at the seat plus the length of the entire adjusting range, and said guide rail means being so arranged that in every position of the seat, the slide rail means are substantially completely surrounded by the guide rail means.

11. A motor vehicle seat according to claim 10, further comprising locking means for fixing the seat including pivotal lever means having a pivot point, linkage means connected with said lever means on both sides of the pivot point thereof, and bolt means on said linkage means adapted to be extended into or retracted from detent apertures provided in the guide rail means.

12. A motor vehicle seat according to claim 11, further comprising flat-iron bar means having several apertures serving as locking places, said flat-iron bar means being arranged within the guide rail means.

13. A motor vehicle seat according to claim 12, further comprising spring means for retaining the bolt means in the engaging positions, said bolt means being adapted to be retracted from the engaging positions by actuating of the lever means.

14. A motor vehicle seat according to claim 11 further comprising spring means for retaining the bolt means in the engaging positions, said bolt means being adapted to be retracted from the engaging positions by actuating of the lever means.

15. A motor vehicle seat according to claim 14, wherein the guide rail means are secured directly at the substantially vertical web portions of the center tunnel.

16. A motor vehicle seat according to claim 14, wherein the guide rail means are secured at the substantially vertical web portions of the lateral longitudinal bearer means.

17. A motor vehicle seat according to claim 14, wherein the guide rail means are directly secured at the substantially vertical web portions of the center tunnel and longitudinal bearer means.

References Cited
UNITED STATES PATENTS

| | | | |
|---|---|---|---|
| 1,838,199 | 12/1931 | Thomas | 248—429 |
| 1,961,653 | 6/1934 | Van Deest | 248—429 |
| 2,742,952 | 4/1956 | Bellamy | 297—344 X |
| 2,864,431 | 12/1958 | Eaton | 296—65 X |
| 3,170,728 | 2/1965 | Barenyi | 297—344 |

FOREIGN PATENTS

| | | |
|---|---|---|
| 9,029 | 3/1895 | Great Britain. |
| 607,142 | 8/1948 | Great Britain. |

LEO FRAGLIA, Primary Examiner

J. A. PEKAR, Assistant Examiner

U.S. Cl. X.R.

248—429